United States Patent [19]
Forster et al.

[11] 4,076,345
[45] Feb. 28, 1978

[54] SEALED JOINT CONSTRUCTION

[75] Inventors: Kevin George Forster, Peoria; Harold Lawrence Reinsma, Dunlap, both of Ill.

[73] Assignee: Caterpillar Tractor Co., Peoria, Ill.

[21] Appl. No.: 719,624

[22] Filed: Sep. 1, 1976

[51] Int. Cl.² ............................................. F16C 11/00
[52] U.S. Cl. .................... 308/120 A; 277/112; 280/96.1; 308/36.1; 308/63; 403/161; 403/288
[58] Field of Search ................. 308/36.1, 36.2, 63, 308/120 A, 120 R, 240, 69; 403/161, 162, 163, 288; 280/96.1, 400, 515; 180/134, 135, 136, 137, 138, 139; 277/112, 165, 206 R

[56] References Cited

U.S. PATENT DOCUMENTS

| | | | |
|---|---|---|---|
| 1,924,586 | 8/1933 | Zerk | 277/112 |
| 1,992,065 | 2/1935 | Grainger | 308/63 |
| 2,311,125 | 2/1943 | Phelps | 280/96.1 |
| 3,343,855 | 9/1967 | Husen | 403/51 |
| 3,492,009 | 1/1970 | Beresnev et al. | 277/112 |
| 3,529,839 | 9/1970 | Greiner et al. | 277/91 |
| 3,669,458 | 6/1972 | Witzenburg | 277/38 |

FOREIGN PATENT DOCUMENTS 229,195  2/1925  United Kingdom ............ 308/120 A

Primary Examiner—Trygve M. Blix
Assistant Examiner—Charles E. Frankfort
Attorney, Agent, or Firm—Wegner, Stellman, McCord, Wiles & Wood

[57] ABSTRACT

A sealed joint including a first member having a shaft affixed thereto, a second member having a bore receiving the shaft, an annular groove in the first member about the shaft and facing the second member, an annular seal in the groove, a sleeve within the bore and about the shaft and having a radially outwardly extending peripheral flange at the end thereof nearest the first member, the flange engaging the seal, and an axial adjusting device whereby the position of the sleeve within the bore may be axially adjusted to selectively set the pressure of the flange on the seal.

5 Claims, 4 Drawing Figures

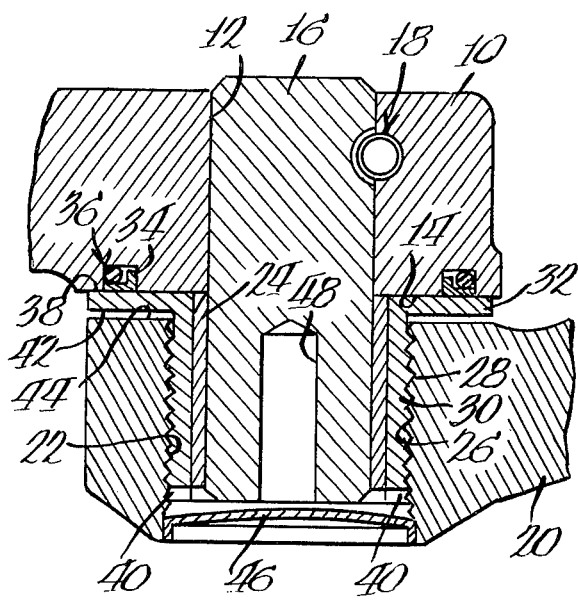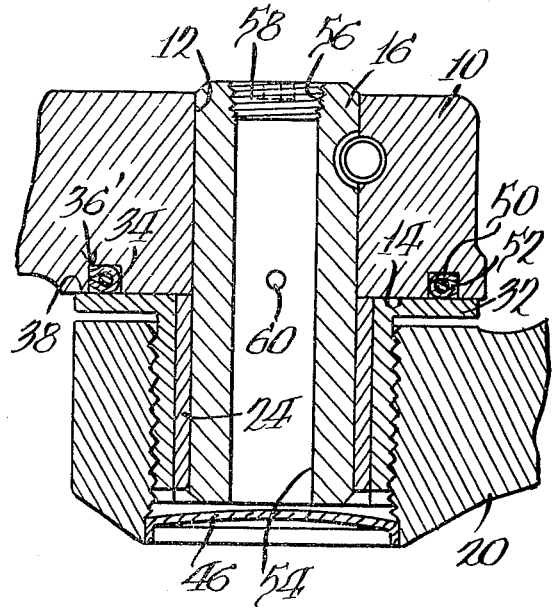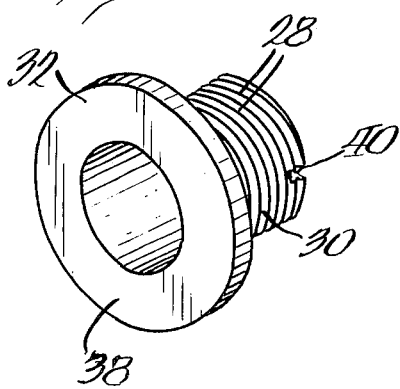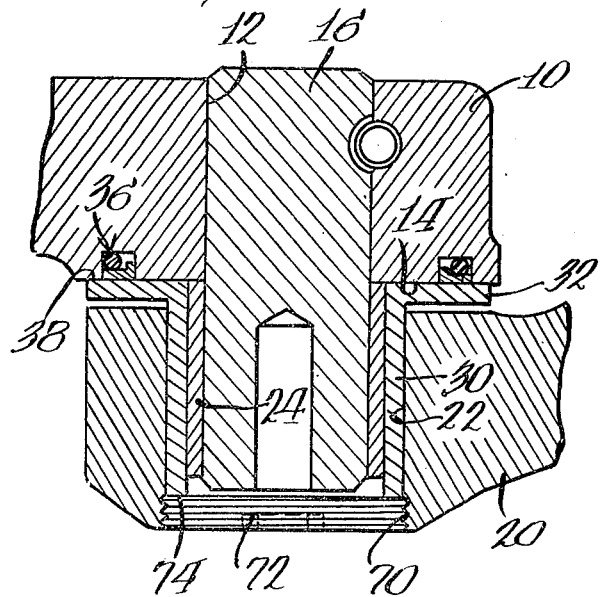

4,076,345

SEALED JOINT CONSTRUCTION

BACKGROUND OF THE INVENTION

This invention relates to sealed rotary joints as, for example, in kingpin construction.

In rotary joints such as kingpins, bearings are employed and in order to prolong the life of the joints, it is necessary to provide lubrication seals thereat. Heretofore, a particular difficulty in fabricating such joints has been the provision of sufficient clearances for initial assembly of the components together, which clearances are not so large as to permit a great deal of play and which are not so small as to damage sealing elements interposed between joint components during the initial assembly process. In some constructions, it has also been particularly difficult to achieve optimal loading of the seal. Excessive loading will accelerate seal wear, leading to a short life joint, while insufficient loading will allow lubricant leakage requiring accelerated maintenance and increased down time of the mechanism in which the joints were used or, premature joint failure due to a lack of lubricant.

SUMMARY OF THE INVENTION

It is the principal object of the invention to provide a new and improved sealed rotary joint, as, a kingpin. More specifically, it is an object of the invention to provide such a joint wherein initial assembly is simplified in that there is provided sufficient clearances to permit initial assembly without damaging seals employed in the construction and wherein optimal loading of the seal can easily be effected.

An exemplary embodiment of the invention achieves the foregoing object in a sealed joint construction including a first member having a flat face with a shaft extending transversely therefrom, a second member having a bore receiving the shaft, and a bearing within the bore and about the shaft. A loading ring is disposed about the shaft between the first and second members and has a planar face facing the flat face on the first member. A seal is disposed about the shaft and between the faces to sealingly engage the same. Means are provided for axially adjusting the loading ring relative to the shaft.

In a preferred embodiment, the adjusting means include a threaded connection. In a highly preferred embodiment, the seal is an annular seal and is disposed in an annular groove in the flat face of the first member.

According to one embodiment, the loading ring is defined by a radially outwardly extending peripheral flange on one end of a sleeve. The threaded connection includes threads on the exterior of the sleeve and threads on the interior of the bore. In another embodiment, the sleeve is unthreaded, while threads are provided on the interior of the bore and a threaded nut, such as a spanner nut, is received in the bore and engages the sleeve at its end opposite that having the flange.

Other objects and advantages will become apparent from the following specification taken in connection with the accompanying drawings.

DESCRIPTION OF THE DRAWINGS

FIG. 1 is a sectional view of one embodiment of a sealed joint construction made according to the invention;

FIG. 2 is a sectional view of a modified embodiment;

FIG. 3 is a perspective view of a loading ring used in the joints; and

FIG. 4 is a sectional view of still a further modified embodiment of the invention.

DESCRIPTION OF THE PREFERRED EMBODIMENTS

An exemplary embodiment of a sealed rotary joint made according to the invention is illustrated in FIG. 1 in the form of a kingpin construction which, for example, may be advantageously employed in the front end construction of a motor grader or the like. The construction includes a first member 10 which may be the spindle housing of the joint and which includes a bore 12 extending therethrough. One side of the member 10 includes a flat face 14 and a shaft 16 is disposed in the bore 12 to extend therefrom generally transversely of the flat face 14. The shaft 16 may be firmly held in the bore 12 by any conventional keying means, generally designated 18.

The construction includes a second member 20 which may be the arm assembly in a kingpin construction and which includes a bore 22 receiving the shaft 16. A sleeve-like bearing 24 is disposed within the bore 22 and about the shaft 16 to establish a rotary connection between the members 10 and 20.

As seen in FIG. 1, the interior of the bore 22 is threaded as at 26 to threadably engage exterior threads 28 on a sleeve 30 disposed within the bore 22 and about the bearing 24. The sleeve 30 has, at one end, a radially outwardly extending flange 32.

Returning to the member 10, the same is provided with an annular groove 34 which opens outwardly of the flat face 14 and surrounds the shaft 16. An annular seal, generally designated 36, is disposed within the groove 34. The seal 36 may be of any desired configuration and generally will be dimensioned so as to extend slightly outwardly of the flat face 14 from the groove 34 when in an unloaded condition.

The flange 32 includes a planar face 38 which faces the flat face 14 and which engages the seal 36. At the end of the sleeve 30 opposite from the flange 32, slots 40 are provided whereby the sleeve 30 may be rotated within the bore 22.

In initial assembly of the joint, the sleeve 30 will be backed away from the first member 10 such that a side 42 thereof opposite from the planar face 38 will be in substantial abutment with the edge 44 of the second member 20. Once the components have been arranged generally in the configuration illustrated (but with the sleeve 30 backed off as mentioned above), the sleeve 30 will be rotated within the bore 22 by means of a tool received in the slots 40 to move the planar face 38 of the flange 32 into sealing engagement with the seal 36. The flange 32 thus acts as a loading ring with the loading being selected by the degree of axial advancement of the sleeve 30 within the bore 22.

The assemblage may be completed by a removable, forcefit grease cap 46 received in an unthreaded end of the bore 22 remote from the first member 10. To provide a supply of lubricant, the shaft 16, at its end remote from the first member 10, may be provided with an interior bore 48 which may be packed with grease or the like.

It will be appreciated that when the sleeve 30 is backed off as aforesaid, clearances for initial assembly are sufficiently large that assembly can take place without damage to the seal 36. When the sleeve 30 is advanced axially, optimal loading of the seal 36 may be achieved and the joint may be adjusted so that virtually no end play will occur, thereby enhancing seal life and performance of the joint. Preferably, to maximize the life of the assembly, the planar face 38 of the flange 32 is hard surfaced as, by chrome plating.

Turning now to FIG. 2, a modified embodiment of the invention is illustrated. In the interest of brevity, like reference numerals have been used for like components and will not be described further, it being understood that the same are identical in construction to their counterparts described above.

In the embodiment illustrated in FIG. 2, a crescent seal, generally designated 36', is employed. The crescent seal 36' is disposed in the groove 34 and includes an annular ring 50 having a C or crescent-shaped cross-section which is filled with a resilient material 52, or the like. In the embodiment illustrated in FIG. 2, the shaft 16 includes a bore 54 which extends the length of the shaft 16. The end of the shaft 16 emerging from the bore 12 in the first member 10 is threaded as at 56 on the interior of the bore 54 for receiving of a removable, threaded plug 58.

One or more bores 60 extend transversely from the bore 54 to the exterior of the shaft at locations adjacent the interface of the flange 32 and the flat surface 14. Bore 54 serves as a large lubricant reservoir and the bores 60 permit the lubricant stored in the reservoir to pass to the interface of the components whereat relative rotation takes place.

Still another embodiment is illustrated in FIG. 4 and, again, where like components are employed, like reference numerals will be utilized for brevity. In the embodiment illustrated in FIG. 4, the threads 28 on a sleeve 30 are omitted as are the threads 26 within bore 22. In lieu thereof, at the end of the bore 22, remote from the first member 10, there is provided a small threaded section 70 for receipt of a threaded nut such as a spanner nut 72. Spanner nut 72 bears against an end 74 of the sleeve 30 remote from the flange 32. By adjusting the position of the spanner nut 72 within the threaded portion 70 of the bore 22, optimum loading pressure of the loading ring or flange 32 can be achieved.

From the foregoing, it will be seen that the invention provides a rotary joint construction as, for example, a kingpin wherein initial assembly clearances can be maximized without excessive play in the final product. It will also be appreciated that the ability to allow maximal initial assembly clearances eliminates the possibility of damage to the seals during initial assembly. At the same time, it will be appreciated that the unique construction of the invention allows optimal loading of the seal.

What is claimed is:

1. A sealed joint comprising:
   a first member having a shaft affixed thereto;
   a second member having a bore receiving said shaft;
   an annular groove in said first member about said shaft and facing said second member;
   an annular seal in said groove;
   a sleeve within said bore and about said shaft and having a radially outwardly extending peripheral flange at the end nearest said first member, said flange engaging said seal; and
   means for axially adjusting the position of said sleeve within said bore to selectively set the pressure of said flange on said seal.

2. The sealed joint of claim 1 wherein said adjusting means comprise interengaging threads.

3. The sealed joint of claim 2 wherein said interengaging threads include threads on the exterior of said sleeve and threads on the interior of said bore.

4. A sealed joint comprising:
   a first member having a shaft affixed thereto;
   a second member having a bore receiving said shaft;
   an annular groove in said first member about said shaft and facing said second member;
   an annular seal in said groove;
   a sleeve within said bore and about said shaft and having a radially outwardly extending peripheral flange at the end nearest said first member, said flange engaging said seal; and
   threads on the interior of said bore and a threaded nut received in said bore and engaging said sleeve at its end opposite said end nearest said first member for axially adjusting the position of said sleeve within said bore to selectively set the pressure of said flange on said seal.

5. The sealed joint of claim 4 wherein said nut is a spanner nut.